United States Patent
Bleus et al.

(10) Patent No.: US 8,379,361 B2
(45) Date of Patent: Feb. 19, 2013

(54) POWER SUPPLY SYSTEM AND METHOD

(75) Inventors: Paul J. M. Bleus, Jupille (BE); Pierre Stassain, Malmedy (BE); Fernand Becker, Heinerscheid (LU)

(73) Assignee: Broadband Power Solutions, en Abrege B.P.S. S.A., Troisvierges (LU)

( * ) Notice: Subject to any disclaimer, the term of this patent is extended or adjusted under 35 U.S.C. 154(b) by 646 days.

(21) Appl. No.: 12/298,930

(22) PCT Filed: May 3, 2007

(86) PCT No.: PCT/EP2007/054277
§ 371 (c)(1),
(2), (4) Date: Mar. 5, 2009

(87) PCT Pub. No.: WO2007/128763
PCT Pub. Date: Nov. 15, 2007

(65) Prior Publication Data
US 2009/0154045 A1 Jun. 18, 2009

(30) Foreign Application Priority Data
May 3, 2006 (EP) .................................. 06113449

(51) Int. Cl.
H02H 9/08 (2006.01)
H02H 9/00 (2006.01)
H02H 3/00 (2006.01)
H02H 7/26 (2006.01)
(52) U.S. Cl. ............................ 361/93.9; 361/58; 361/67
(58) Field of Classification Search .................... 361/58, 361/93.9, 67
See application file for complete search history.

(56) References Cited

U.S. PATENT DOCUMENTS

| | | | |
|---|---|---|---|
| 3,873,887 A * | 3/1975 | Barkan et al. | 361/71 |
| 4,814,966 A | 3/1989 | Ekstrand | |
| 5,561,579 A | 10/1996 | Gyugyi et al. | |
| 6,246,597 B1 * | 6/2001 | Peron | 363/54 |
| 6,252,379 B1 | 6/2001 | Fischl et al. | |
| 7,061,141 B2 * | 6/2006 | Yamamoto | 307/65 |
| 2003/0227785 A1 * | 12/2003 | Johnson, Jr. | 363/37 |

FOREIGN PATENT DOCUMENTS
WO 2004/102785 11/2004

* cited by examiner

*Primary Examiner* — Rexford Barnie
*Assistant Examiner* — Christopher Clark
(74) *Attorney, Agent, or Firm* — Ladas & Parry LLP

(57) ABSTRACT

A power supply system S comprising a power processor 1, having a power input 2 and an AC power output 3 with a nominal voltage $V_N$ and a nominal current $I_N$, and a power supply safety circuit 6 connected in parallel to said power processor 1 between said power input 2 and said AC power output 3. The purpose of the power supply safety circuit 6 is to provide an additional current in case of a short circuit condition downstream of the AC power output 3, so as to trigger the opening of an individual circuit breaker 4 connected to the short circuited load 5. For this purpose the power supply safety circuit 6 comprises a bidirectional switch 7, control means 12 for closing said bidirectional switch 7 after detecting a short circuit condition downstream of the AC power output 3 and a current limiter 9, preferably an impedance, connected in series to said bidirectional switch 7 to limit the current that can flow through the power backup circuit 6 to a maximum current of $\alpha I_{Nout}$, wherein $\alpha$ has a value between 5 and 20, preferably between 7 and 13, and most preferably about 10. The invention also comprises a method of operation of said power supply system S.

23 Claims, 2 Drawing Sheets

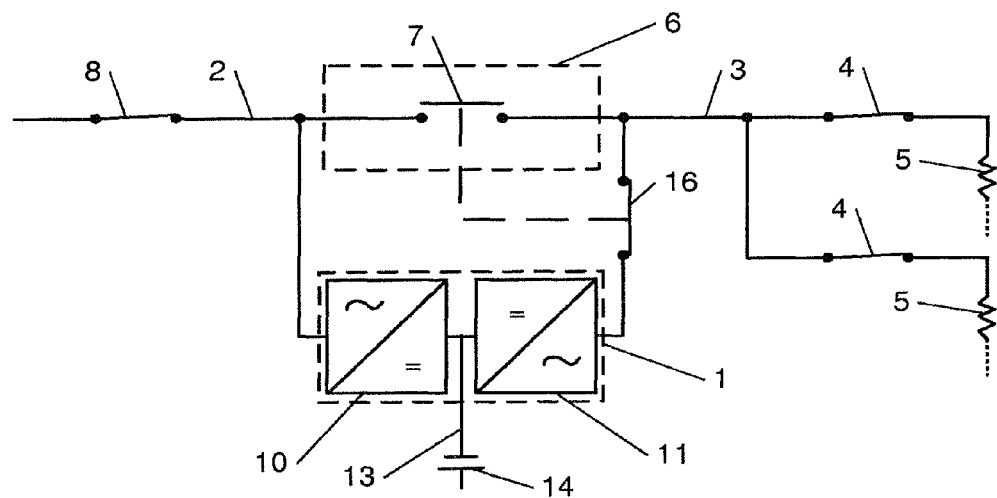
Fig. 1 *(Prior Art)*
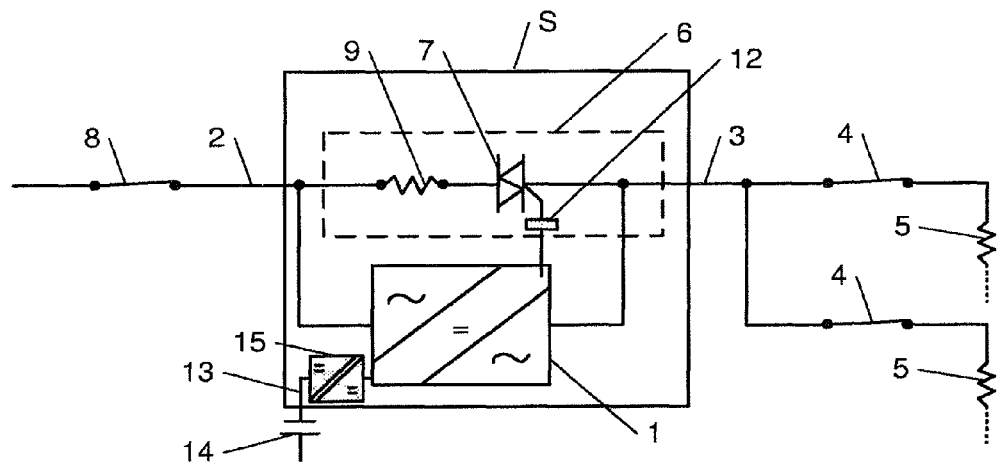
Fig. 2

POWER SUPPLY SYSTEM AND METHOD

FIELD OF THE INVENTION

The present invention relates to the field of power supply systems and particularly to that of power supply systems for critical loads.

BACKGROUND OF THE INVENTION

It is known to protect critical loads supplied with AC power, by providing at least one power processor for, for instance, filtering harmonics in the power supply voltage, and circuit breakers to protect the electric circuitry from overcurrents in the case of a short-circuit at the critical load. However, such power processors have a weak overcurrent shortcircuit capacity. For this reason, the power supply system of the closest prior art, as represented in FIG. 1, comprises, besides a power processor 1 (in this example, an AC/DC/AC converter) and a first bidirectional switch 16 connected in series between a power input 2 with a nominal input voltage $V_{Nin}$ and an AC power output 3 having a nominal output voltage $V_{Nout}$ and a nominal output current $I_{Nout}$, a power backup circuit 6 connected in parallel to said power processor 1 between said power input 2 and AC power output 3 and possibly comprising a second bidirectional switch 7 and control means (not illustrated) for opening said first bidirectional switch 16 and closing said second bidirectional switch 7 after detecting a short circuit condition downstream of the AC power output, by, for example, detecting if the voltage at the AC power output 3 of said power processor 1 drops below a threshold set at less than 80% of said nominal output voltage $V_{Nout}$. The power supply safety circuit 6 will therefore bypass said power processor 1 in the case of a shortcircuit at a critical load 5 to which it is connected through an individual circuit breaker 4. A similar power supply system and method was disclosed in International Patent Application WO 2004/102785.

This arrangement has the drawback that a higher-rated circuit breaker 8 upstream of the power processor 1 can open at the same time as the individual circuit breaker 4 downstream of the power processor 1. Therefore, if the power processor 1 is connected to a plurality of loads 5, as illustrated, a shortcircuit in one of them will lead to the power supply to all of them being interrupted. With critical loads, this is of course undesirable, but providing each individual critical load with its own power processor and corresponding bidirectional switch would be complicated and costly.

SUMMARY OF THE INVENTION

The power supply system of the invention solves this problem by also comprising a current limiter in the power backup circuit connected in series to the bidirectional switch for limiting the current that can flow through the power backup circuit to $\alpha I_{Nout}$ wherein $\alpha$ has a value between 5 and 20, preferably between 7 and 13, and most preferably about 10. The value of $\alpha$ can be selected in function of the power network specifications (impedance, shortcircuit power of the feeder, short circuit voltage, ...) and breaker specifications (delay curve, nominal current, temperature, ...).

It must be noted that by current limiter, what is meant is not a fuse or circuit breaker, which would interrupt the current altogether above a certain threshold, but a means for restricting the current flowing through the power backup circuit to said maximum value.

By providing this current limiter, the invention ensures that, in case of a shortcircuit in one critical load connected to one of the at least one of the circuit breakers, a peak of just enough additional current flows through the power supply safety circuit to trigger that particular circuit breaker, without any upstream, higher-rated circuit breakers being opened. In addition, compared to prior art devices where the critical load is directly connected to the power input when switch 7 is closed, the system according to the invention has the advantage that the current limiter acts as a filter between the power input and the critical load when switch 7 is closed.

Preferably, the current limiter is an impedance, in particular a resistor, having an impedance value of:

$$\frac{V_{Nin}}{\alpha I_{Nout}}$$

The advantages of such an impedance as a current limiter are its reliability, simplicity and cheapness. Such an impedance could also be embodied in an inductor instead of in a resistor. This would however have the drawbacks of generating an overvoltage at switching off and producing a phase shift between current and voltage.

Preferably, the control means is also provided for opening said bidirectional switch after it has been closed for a predetermined time period, preferably 20 ms. Since the switch is closed for a very limited period of time, the energy losses are substantially reduced compared to prior art devices. In addition, it improves the lifetimes of the impedance and the bidirectional switch.

Preferably, the bidirectional switch of the power supply system of the invention is a triac. In the prior art, the bidirectional switch was realised in the form of two antiparallel thyristors, since a triac could have not been robust enough to handle the rapid variation in voltage and current at the power supply safety circuit of the prior art. An additional advantage of the invention is that, by slowing down the voltage variation at the power safety circuit, it enables the two antiparallel thyristors of the prior art to be substituted by a cheaper, simpler single triac. Alternatively, however, the bidirectional switch could still be embodied in two antiparallel thyristors or any other bidirectional switch which is fast enough (such as MOS, IGBT or transistor switches).

The invention also comprises a method of supplying an additional current so as to open an individual circuit breaker connecting an AC power output of a power processor, having a nominal output voltage $V_{Nout}$ and a nominal output current $I_{Nout}$, to a critical load when said critical load suffers a short circuit condition, comprising the steps of:

providing a power backup circuit connected in parallel to the power processor between a power input of said power processor having a nominal input voltage $V_{Nin}$ and said AC power output and comprising a bidirectional switch, preferably a triac and a current limiter connected in series to the bidirectional switch for limiting the current that can flow through the power backup circuit to $\alpha I_{Nout}$, wherein $\alpha$ has a value between 5 and 20, preferably between 7 and 13, and most preferably about 10; detecting said short circuit condition; and closing said bidirectional switch.

BRIEF DESCRIPTION OF THE DRAWINGS

The invention will be described in detail and non-limitingly with reference to the accompanying figures, in which:

FIG. 1 represents the prior art;

FIG. 2 represents an embodiment of the invention wherein the power processor comprises an AC/DC/AC converter;

DETAILED DESCRIPTION

Figure 3:
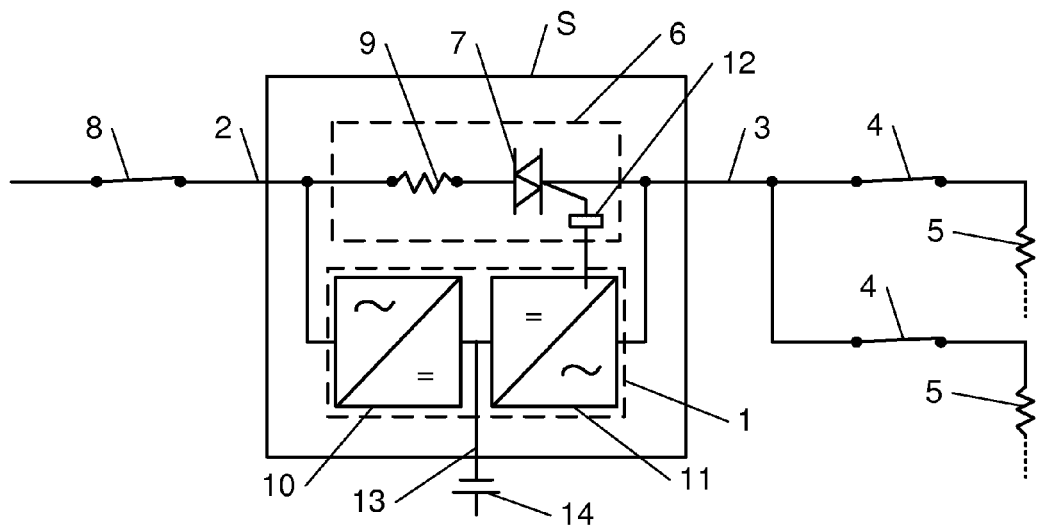
FIG. 3 represents an alternative embodiment wherein the power processor comprises an AC/DC converter and a DC/AC converter connected in series.

Turning now to FIG. 2, a power supply system S according to the invention is depicted that comprises a power processor 1 (in this case comprising an AC/DC converter 10 and a DC/AC converter 11 connected in series) with a power input 2 having a nominal input voltage $V_{Nin}$ and an AC power output 3 having a nominal output voltage $V_{Nout}$ and a nominal output current $I_{Nout}$; and a power backup circuit 6 connected in parallel to said power processor 1 between said power input 2 and said AC power output 3. In use, said AC power output 3 is connected to several parallel individual circuit breakers 4, each one of them being rated at a current $I_B$. The rated current $I_B$ of each one of the individual circuit breakers 4 is lower than the nominal output current $I_{Nout}$ of the AC power output 3. The power input 2 is connected to a power source (not illustrated) through a higher-rated upstream circuit breaker 8 in order to meet the segregation requirements (the rated current and the trip parameter ($I^2t$) of upstream breaker 8 should be higher than the rated current and the trip parameter of downstream breaker 4) of breaker 8 and each individual circuit breaker 4 is connected to a critical load 5.

The power backup circuit 6 comprises a bidirectional switch 7, in the form of a triac control means 12 for closing said bidirectional switch 7 after detecting a short circuit condition downstream of the AC power output 3, and a current limiter 9, in this case an impedance with an impedance value of $$\frac{V_{Nin}}{\alpha I_{Nout}}$$

wherein has a value between 5 and 20, preferably between 7 and 13, and most preferably about 10. Although in this depicted example the current limiter 9 is embodied in a resistor, it could take the form of any device having such an impedance value, such as an inductance, or suitable for limiting (in the sense of restricting, not interrupting) the current flowing through the power backup circuit 6 by, for example, electronically reducing voltage.

The control means 12 can be set to detect the short circuit condition downstream of the AC power output 3 when the voltage at the AC power output 3 falls below a threshold value of at most 80% of the nominal output voltage $V_{Nout}$, in particular below 20% of $V_{Nout}$ and/or the output current at the AC power output 3 rises above a threshold value of at least 120% of the nominal output current $I_{Nout}$, in particular above 150% of $I_{Nout}$. The control means 12 can also be separate from or integrated in the power processor 1.

If one of the critical loads 5 suffers a shortcircuit, the control means 12 will close the bidirectional switch 7. As the bidirectional switch 7 closes, additional current will flow through the power backup circuit 6, including the current limiter 9, in parallel to the current flowing through the power processor 1. The current limiter 9 is chosen so that the additional current flowing through the power backup circuit 6 is just enough to open the individual circuit breaker 4 connected to the short-circuited load 5 without opening the upstream circuit breaker 8.

Since after the individual circuit breaker 4 is opened the power backup circuit 6 has fulfilled its task, it is advantageous to also include means for automatically opening said bidirectional switch 7 after it has been closed for a predetermined time period, preferably just slightly longer than the triggering time of the individual circuit breakers 4. For instance, if the circuit breakers 4 need 10 ms to open, the bidirectional switch 7 could be opened after 20 ms of being closed. The opening of the bidirectional switch 7 could also be triggered by the output voltage. The switch could be opened when this output voltage reaches a predetermined value, e.g. $0.8 \times V_{Nout}$. In this way the other critical loads 5 are minimally affected and the life of the impedance 9 is extended. This feature is particularly useful when the power processor 1 is an AC/DC/AC converter, as in the embodiment of FIG. 2, since otherwise the losses in the current limiter 9 would quickly become very high and the overall efficiency very poor. Since the bidirectional switch is closed during a very short time, e.g. 20 ms, the efficiency of the system is not affected by power supply safety circuit 6. This power backup circuit is thus a short time pulse current circuit.

In the embodiment of FIG. 2, the power processor 1 is an AC/DC/AC converter. Such a converter would provide harmonic filtering of the voltage at the AC power output 3 if, for instance, harmonic currents were generated by a nonlinear load 5. Alternative arrangements, such as an AC/DC converter 10 connected in series to a DC/AC converter 11 as in FIG. 3 could also fulfil the same function. A power processor 1 could also incorporate other features, such as a backup power supply in case supply at the power input 2 failed. As illustrated, the power processor 1 may have a DC power input 13, which can be connected to a battery 14, possibly through a DC/DC converter 15.

Figure 4:
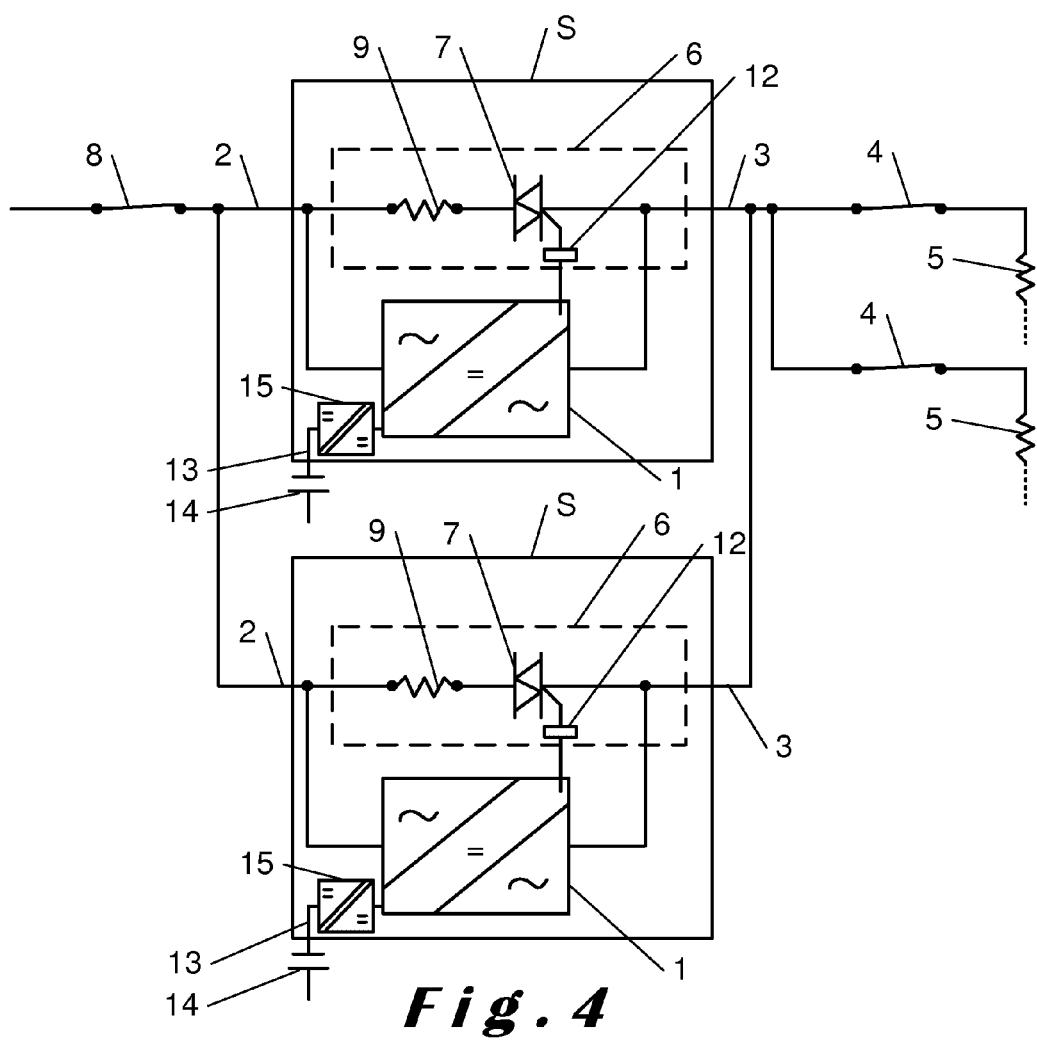
FIG. 4 represents an alternative embodiment wherein a plurality of power processors are connected in parallel.

It could also be envisaged to connect several such power supply systems S in parallel, as depicted in FIG. 4, so as to provide redundancy and split the total load between them. In this case, the rated current $I_B$ of each one of the individual circuit breakers 4 must be lower than the sum $\Sigma I_{Nout}$ of the nominal output currents $I_{Nout}$ of the AC power outputs 3 of all the power supply systems S connected in parallel.

Although the present invention has been described with reference to specific exemplary embodiments, it will be evident that various modifications and changes may be made to these embodiments without departing from the broader scope of the invention as set forth in the claims. Accordingly, the description and drawings are to be regarded in an illustrative sense rather than a restrictive sense.

The invention claimed is:

1. A power supply system (S), comprising:
   a power processor (1) having a power input (2) with a nominal input voltage VNin and an AC power output (3) with a nominal output voltage $V_{Nout}$ and a nominal output current $I_{Nout}$; and
   a power backup circuit (6) connected in parallel to said power processor (1) between said power input (2) and said AC power output (3) and comprising:
   a bidirectional switch (7), and
   control means (12) for closing said bidirectional switch (7) after detecting a short circuit condition downstream of the AC power output (3);
   wherein said power backup circuit (6) also comprises a current limiter (9) connected in series to said bidirectional switch (7) to limit the current that can flow through the power backup circuit (6) to a maximum current which is capable of tripping a breaker (4) downstream of said power processor (1) without tripping a breaker (8) upstream of said power processor (1) when said bidirectional switch (7) is closed.

2. A power supply system (S) according to claim 1, wherein the current that can flow through the power backup circuit (6) is limited to a maximum current of $\alpha I_{Nout}$ wherein a has a value between 5 and 20.

3. A power supply system (S) according to claim 2, wherein the current limiter (9) is an impedance having an impedance value of $$\frac{V_{Nin}}{\alpha I_{Nout}}$$

wherein α has a value between 5 and 20.

4. A power supply system (S) according to claim 1, wherein the control means (12) is set to detect the short circuit condition downstream of the AC power output (3) when the voltage at the AC power output (3) falls below a threshold value of at most 80% of the nominal output voltage $V_{Nout}$, in particular below 20% of $V_{Nout}$ and/or the current at the AC power output (3) rises above a threshold value of at least 120% of the nominal output current $I_{Nout}$ in particular above 150% of $I_{Nout}$.

5. A power supply system (S) according to claim 1, wherein said control means (12) is also provided for opening said bidirectional switch (7) after said bidirectional switch (7) has been closed for a predetermined time period, preferably 20 ms.

6. A power supply system (S) according to claim 1, wherein said bidirectional switch (7) is a triac.

7. A power supply system (S) according to claim 1, wherein the power processor (1) comprises an AC/DC/AC converter.

8. A power supply system (S) according to claim 1, wherein the power processor (1) comprises a DC/AC converter (11).

9. A power supply system (S) according to claim 7, wherein the power processor (1) comprises an AC/DC converter (10) connected in series to the DC/AC converter (11).

10. A power supply system (S) according to claim 1, wherein the power processor (1) comprises a DC power input (13) connectable to a battery (14).

11. A plurality of power supply systems (S) according to claim 1, and connected in parallel.

12. A plurality of power supply systems (S) according to claim 1, and connected in parallel, wherein nominal input voltage $V_{Nin}$ and nominal output current $I_{Nout}$ of each power processor and maximum current of each power backup circuit (6) are substantially the same.

13. A method of supplying an additional current for opening an individual circuit breaker (4) connecting an AC power output (3) of a power processor (1), having a nominal output voltage $V_{Nout}$ and a nominal output current $I_{Nout}$, to a critical load (5) when said critical load (5) suffers a short circuit condition, comprising the steps of:

providing a power backup circuit (6) connected in parallel to the power processor (1) between a power input (2) of said power processor (1) having a nominal input voltage $V_{Nin}$ and said AC power output (3) and comprising a bidirectional switch (7), preferably a triac, and a current limiter (9), preferably a resistor, connected in series to the bidirectional switch (7) to limit the current that can flow through the power backup circuit to a maximum current which is capable of tripping said individual circuit breaker (4) without tripping a breaker (8) upstream of said power processor (1) when said bidirectional switch (7) is closed;

detecting said short circuit condition; and closing said bidirectional switch (7).

14. A method according to claim 13, wherein the current that can flow through the power backup circuit (6) is limited to a maximum current of $\alpha I_{Nout}$ wherein α has a value between 5 and 20.

15. A method according to claim 14, wherein said short circuit condition is detected when the voltage at the AC power output (3) falls below a threshold value of at most 80% of the nominal output voltage $V_{Nout}$, and/or the current at the AC power output (3) rises above a threshold value of at least 120% of the nominal output current $I_{Nout}$.

16. A power supply system according to claim 2, wherein α has a value between 7 and 13.

17. A power supply system according to claim 16, wherein α is about 10.

18. A power supply system according to claim 3 wherein α has a value between 7 and 13.

19. A power supply system according to claim 18, wherein α is about 10.

20. A method of supplying additional current for opening a circuit breaker according to claim 14, wherein α has a value between 7 and 13.

21. A method according to claim 20, wherein α is about 10.

22. A power supply system (S) according to claim 3, wherein said impedance is a resistor.

23. A method according to claim 14, further comprising the step of reopening said bidirectional switch (7) after said bidirectional switch (7) has been closed for a predetermined time period.

* * * * *